Dec. 27, 1949     M. M. MARISIC ET AL     2,492,808
GELLING VISCOUS SOL PARTICLES IN AQUEOUS AMMONIA
Filed March 27, 1947     3 Sheets-Sheet 1
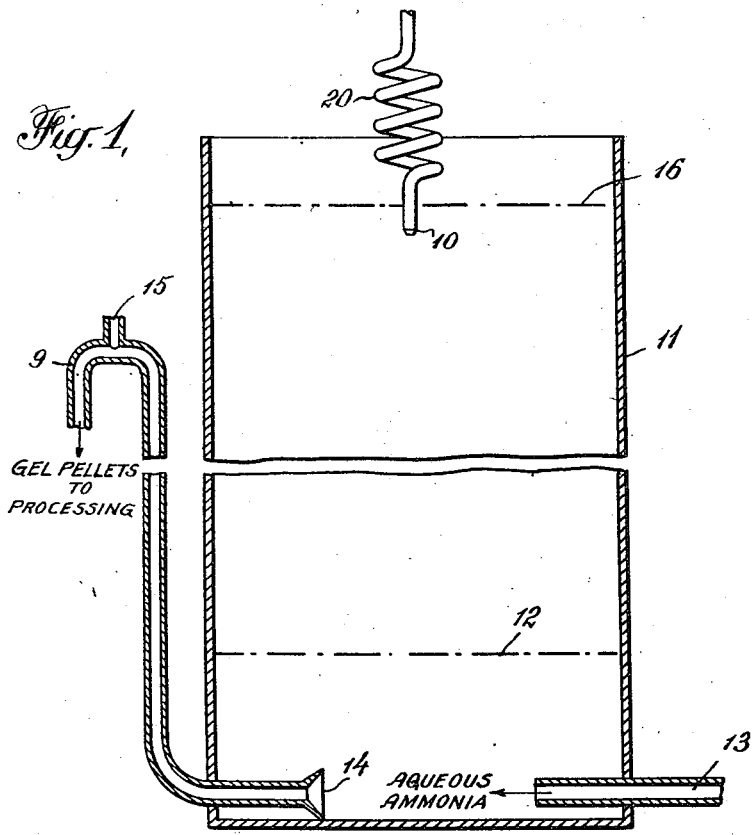
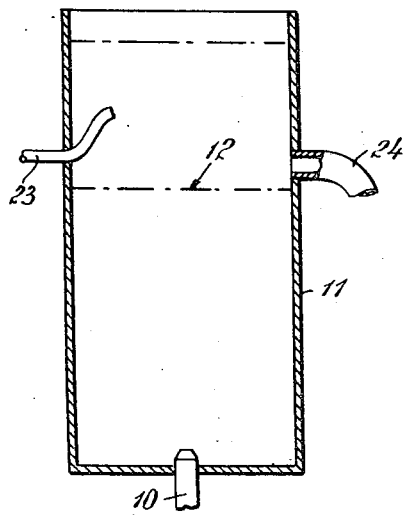
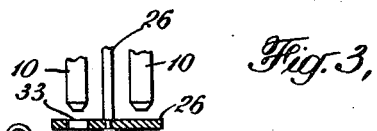
INVENTORS
MILTON M. MARISIC and
EDWARD M. GRIEST
BY
ATTORNEY

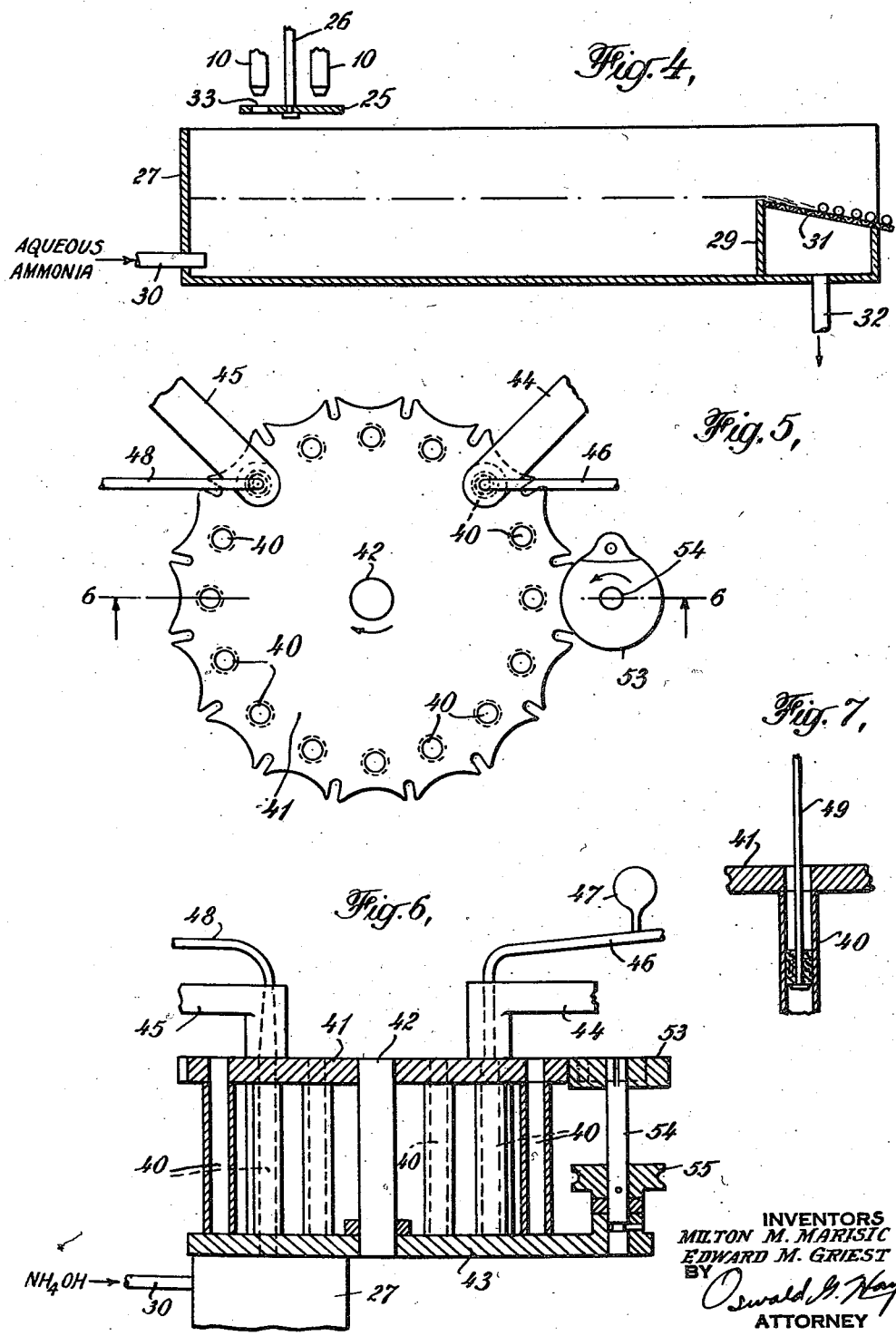

Dec. 27, 1949 M. M. MARISIC ET AL 2,492,808
GELLING VISCOUS SOL PARTICLES IN AQUEOUS AMMONIA
Filed March 27, 1947 3 Sheets-Sheet 3
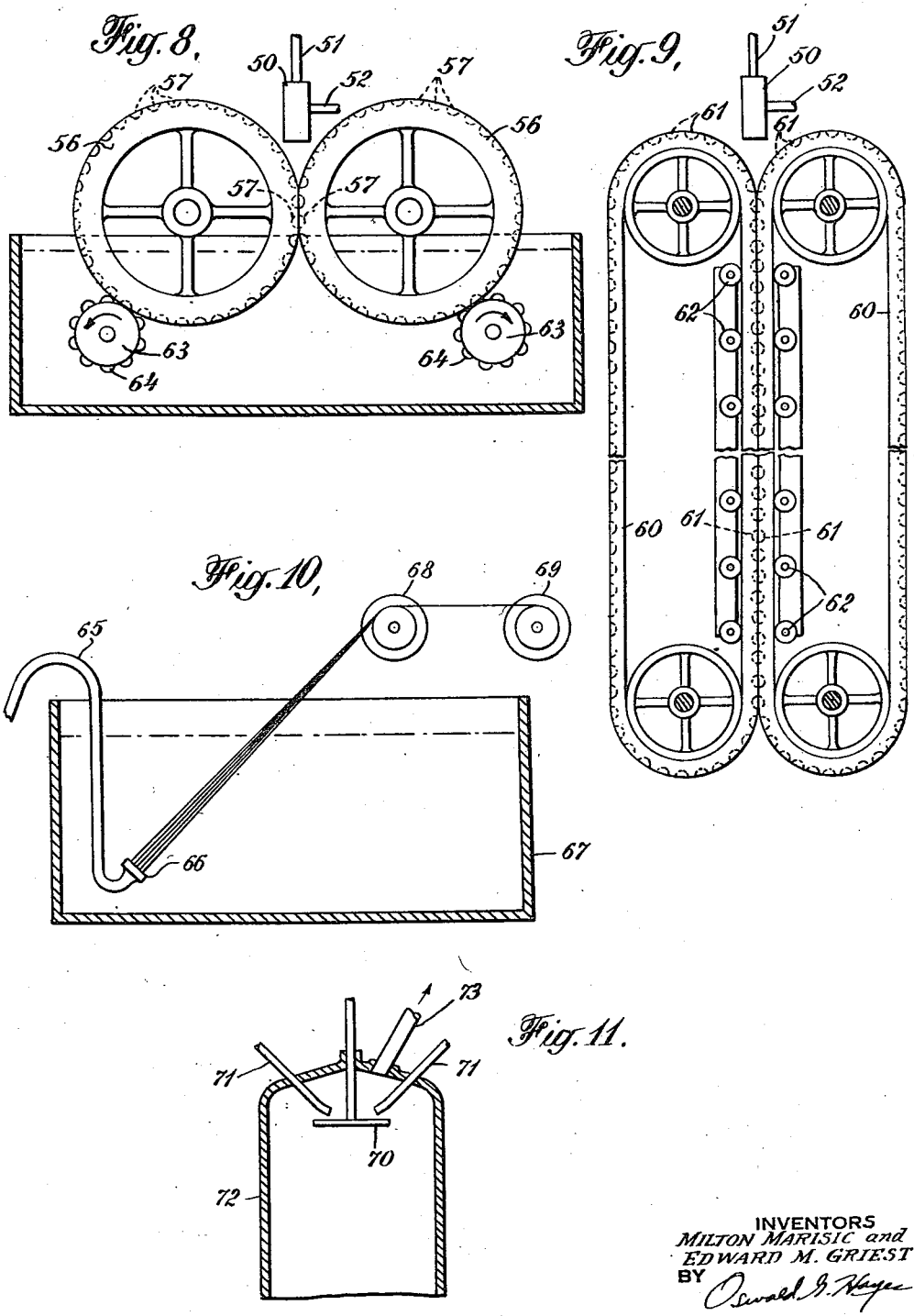
INVENTORS
MILTON MARISIC and
EDWARD M. GRIEST
BY
ATTORNEY Patented Dec. 27, 1949

2,492,808

UNITED STATES PATENT OFFICE 2,492,808

GELLING VISCOUS SOL PARTICLES IN AQUEOUS AMMONIA

Milton M. Marisic, Northfield, Ill., and Edward M. Griest, State College, Pa., assignors to Socony-Vacuum Oil Company, Incorporated, a corporation of New York Application March 27, 1947, Serial No. 737,490

2 Claims. (Cl. 252—448)

This invention is concerned with a process for manufacture of formed pellets of inorganic oxide hydrogels and the products obtained therefrom by removal of the aqueous phase in whole or part.

Several prior applications of Milton M. Marisic discuss processes for forming formed hydrogel particles as noted below:

Application Serial No. 461,455, abandoned, filed October 9, 1942, discloses formation of silica and silica-alumina gel pellets by depositing gelable sols on wax-coated surfaces having depressions corresponding to the desired shape of pellets and permitting the sol to gel.

Application Serial No. 461,454, now U. S. Patent No. 2,385,217, filed October 9, 1942, describes the preparation of inorganic gels in spheroidal form by extrusion of gelable colloidal solutions into a water-immiscible liquid to form sol globules which gel within this medium while in motion and are removed therefrom in a stream of water. This method is applicable to colloidal solutions having relatively short gelation times, preferably of less than one minute.

In application Serial No. 491,545, abandoned, filed June 19, 1943, is disclosed the conversion of inorganic colloidal solutions having long gelation times into spherical gel pellets by preheating the sol for a predetermined length of time so that it will gel in a reasonably short time as, for example, five seconds when introduced in the form of globules into a column of oil maintained at an elevated temperature, which is higher than that of the preheater.

The present invention constitutes an improvement over these prior methods in that the final stage of setting of the gel is induced by immersion in an aqueous ammonia solution.

The transformation of a sol to a gel is a gradual change from a clear, limpid hydrosol which does not differ from dilute aqueous solutions in any manner detectable directly by eye or touch. It is transparent and its viscosity is not noticeably different from that of water. The accepted theory involves a gradual increase in size of precipitated oxides until, at the expiration of approximately one-half of the gelation time, the sol is appreciably viscous and resembles a thin sugar syrup. The viscosity continues to increase and as the sol approaches the time of forming a true hydrogel, it flows with greater difficulty. At some point, which cannot be detected as an instantaneous change in state similar to freezing of a pure liquid, the property of flow disappears. The hydrogel formed when the property of flow is lost is self-sustaining. It may be cut with a knife or broken and the surfaces so formed will be retained unless destroyed by some outside mechanical agency, as in milling.

According to the present invention, the liquid sol is caused to assume a desired physical form at a stage of high viscosity hereinafter defined and the sol is caused to change rapidly to the hydrogel state in that physical form. This result is obtained by immersing the formed hydrosol in aqueous ammonia. Any alkaline solution containing ammonium ions, including the substituted ions derived from amines, may be employed; but a solution of ammonium hydroxide in water is preferred. The state of the hydrosol at the time of immersion is critical for most gels, notably those containing silica and the related oxides such as germania.

Our invention is based on the discovery that viscous inorganic sols coagulate (or gel) immediately when placed in an aqueous solution of ammonia and assume whatever shapes the sols have at the moment of immersion in ammonia. Droplets of viscous silica sol on falling freely through air assumed spheroidal forms which were retained when the droplets were caught in an aqueous ammonia solution of 0.90 specific gravity. On the other hand, when non-viscous silica hydrosol is dropped into ammonia solution the globules of sol disintegrate and a slimy precipitate forms which is not similar to the hydrogel globules. When the acidic silica hydrosol is introduced into an oil layer so as to form globules before entering the ammonia solution, disintegration and precipitation of silica occurs at the interface of the oil and the ammonia solution if the viscous stage is not reached by the time the globules pass through the interface.

The preferred method of this invention involves extruding viscous inorganic sols into a water-immiscible fluid to form globular particles and conducting these particles into a coagulating liquid to convert them into firm hydrogel pellets having spheroidal shapes and smooth surfaces. The water-immiscible fluid may be any liquid or combination of liquids which is immiscible with water such as, for example, hydrocarbon oils, petroleum naphtha, kerosene, carbon tetrachloride, etc. The coagulating liquid may be any fluid capable of inducing gelation such as, for instance, aqueous solutions of ammonia, ammonium carbonate, ammonia with inert salts like ammonium nitrate, mixture of ammonia and ammonium carbonate, etc.

Our invention includes forming viscous inorganic sols into any desired shape as, for example, rods, hemispheres, discs, etc., by mechanical means and inducing gelation by immersion in coagulating liquids or subjection to a coagulating atmosphere such as gaseous ammonia and the like.

Other objects and advantages of the invention will be apparent from the discussion below of specific embodiments of the invention in connection with the annexed drawings wherein:

Figure 1 is a diagrammatic showing of apparatus for practicing the preferred embodiment of the invention;

Figure 2 is a modification thereof;

Figure 3 illustrates apparatus for forming the pellets by dropping through air to a pool of aqueous ammonia;

Figure 4 is a showing of apparatus for a similar operation wherein the pellets are removed in a current of ammonia;

Figure 5 is a plan view of apparatus for mechanical casting of rod-shaped pellets;

Figure 6 is a vertical section on line 6—6 of Figure 5;

Figure 7 is a section through means for removing cast jelly and cleaning the mold;

Figure 8 is another type of casting apparatus;

Figure 9 shows means providing for aging the sol while the same is retained in molds;

Figure 10 is a diagrammatic showing of apparatus for spinning the sol to prepare gel filaments; and Figure 11 is a section through apparatus for spraying the viscous sol to produce small pellets.

Referring to Figure 1, a nozzle, indicated generally at 10, is mounted at the top of a column of water-immiscible fluid in a tank 11. At the bottom of tank 11 is a layer of aqueous ammonia which forms an interface 12 with the column of said fluid. Ammonia is continuously supplied through inlet 13 and withdrawn through outlet 14. The interface at 12 is maintained by properly adjusting the height of conduit 9 in correlation with the density of the fluid medium and the rate at which ammonia is supplied at 13. Vent 15 prevents siphoning action. The flow of ammonia carries away the gel pellets through outlets 14 and 9 to suitable washing and treating stages.

The colloidal sol from which the pellets are formed is made up and admitted to the column of fluid by the nozzle 10 from an aging coil 20 and/or aging tank (not shown). Preferably, the apparatus will include a plurality of nozzles 10 in order to increase the capacity of the unit, but only one is shown here for purposes of simplicity. The nozzle 10 is arranged to admit a continuous stream of the sol below the surface 16 of the water-immiscible fluid, wherein the stream of the viscous sol breaks up into globules. The sol or globules thereof may be dropped on the surface of the fluid but this tends to break them and impairs control over pellet size obtained by injecting the sol under the surface of the liquid. It must be borne in mind that considerable shrinkage takes place, not only by syneresis, but also during drying and processing. Control of globule size must take into account this shrinkage.

The size of the globules is controlled by the rate which the sol flows through the nozzle orifice and the dimensions of the latter. A simple modification in controlling the size of the globules is the introduction of a baffle just outside of the nozzle and in the stream of the sol. Furthermore, sizing is a matter of relative densities and viscosities of the sol and water-immiscible liquid.

Another modification that may be applied to the mixing nozzle illustrated in Figure 1, is to provide means for injecting air or any other desired material into the sol and agitating in the nozzle to obtain a uniform dispersion. By this means, hydrogel pellets are obtained which contain numerous small bubbles of air or particles of other desired material such as dried gel, which serve to make the processed dry gel less dense in nature and more porous, or to possess other properties desired.

The apparatus of Figure 2 is adapted for upward flow of the sol during gelation. In this case, the nozzle 10 is positioned at the bottom of shell 11 which contains a column of water-immiscible liquid heavier than ammonia, with ammonia thereabove, the liquid-liquid interface being again indicated at 12. Ammonia is admitted by a pipe 23 while ammonia carrying gelled spheroids is withdrawn by discharge line 24.

According to the embodiments shown in Figures 3 and 4, the sol is dropped through air, thereby assuming a generally spherical shape, into a pool of ammonia wherein they become gelled. Alternatively, the sol may be dropped through a column containing an atmosphere of gaseous ammonia into a pool of liquid or other suitable means to reduce impact breakage. Because of the viscosity of the sol, it is often desirable to introduce mechanical means to break the stream into small portions. Such a modification, also adaptable to and contemplated for the apparatus of Figures 1 and 2, is shown in Figures 3 and 4 wherein a plurality of nozzles 10, of which two are shown, discharge streams downwardly toward discs 25 mounted on rotating shafts 26. The discs 25 are provided with a plurality of openings 33 through which the sol can flow. The sol stream is interrupted at predetermined intervals as the discs 25 rotate to give globules of desired size.

The globules of sol assume generally spherical shape in dropping to a pool of ammonia in vessel 27, which, in Figure 3 is provided with an endless belt 28 to remove formed gel pellets. The belt 28 may suitably run in grooves in the end walls of vessel 27 to cause it to follow the proper course through the vessel.

In the embodiment of Figure 4, gel pellets are removed from vessel 27 in a current of aqueous ammonia flowing over weir 29 and induced by flow through an inlet pipe 30. The current of ammonia flows over the weir onto a screen 31 down which the pellets roll to be processed, while ammonia flows through the screen to a sump from which it is removed by pipe 32 and may be returned to inlet 30, preferably after fortifying by addition of ammonia to maintain the proper concentration. A portion of all of such recycled ammonia may pass through equipment, such as an evaporator, to remove any salts washed out of the sol.

Referring now to Figures 5 and 6, a preferred apparatus for practice of the invention by mechanical casting comprises a plurality of cylindrical molds 40 mounted on a disc 41, carried by a vertical shaft 42. An opening through the disc 41 communicates with each mold 40 to provide for filling the mold and ejecting the formed viscous sol. A throttle plate 43 closes the lower ends of the molds 40 and provides support for the shaft 42 rotatably mounted therein. Carried above disc 41 are a pair of supports 44 and 45. A bore in support 44 provides for admission of sol from a suitable source of supply, such as pipe 46 having a surge chamber 47. A similar bore in support 45 is adapted to admit air under pressure from pipe 48 to eject the formed sol.

The interior surfaces of molds 40 are preferably composed of or coated with a substance to which the sol does not adhere, for example, paraffin wax. In general, those substances which are not wetted by the sol will not cause sticking by adherence thereof. If metal, glass or other substance to which the sol adheres is used for molds 40, these may be coated with a material such as petrolatum or heavy lubricating oil to prevent adherence. For example, a swab 49 such as that shown in Figure 7 may be passed into the mold after ejection of the molded sol. Alternatively, swab 49 may also serve as the ejector, pushing out one rod of sol and applying a coating to the mold on the same stroke.

The molded sol ejected from molds 40 passes immediately into aqueous ammonia in vessel 27 from which it may be removed in the same manner as described above in connection with Figures 1 to 4, inclusive. The molds 40 may be heated, as by a current of heated air, to further the aging step, which may be conducted entirely in molds 40 if desired.

Rotation of disc 42 and molds 40 may be continuous, but intermittent rotation is preferred for smoother operation in filling the molds and ejecting viscous sol. The drive shown in Figure 6 is adapted to intermittent rotation by toothed wheel 53 mounted on shaft 54 which is continuously rotated by power applied through sheave 55.

The invention may also be practiced in apparatus as illustrated in Figures 8 and 9, using molds formed by matching indentations in resilient drums or belts. In the apparatus of Figure 8, two drums 56 are provided having resilient bodies with hemispherical matching depressions 57 in each drum. The depressions may correspond to longitudinal halves of cylinders if rod-shaped particles are desired. It will be apparent that close control is essential to best operation of the device of Figure 8. No matter what the speed of rotation of the drums, the time interval for molding is relatively short. Molding at temperature above the temperature of the sol as formed is also contemplated in using the apparatus of Figure 8 or that of Figure 9 wherein a pair of belts 60 are provided with matching depressions 61. The time of molding with attendant aging with these belts may be very long, a plurality of pressure rolls 62 being used to maintain close contact of the belt faces intermediate the ends. In connection with either drums or belts, drive may be by means of drums 63 having knobs 64 which match the depression in the forming surfaces. The knobs 64 may also be used to aid in cleaning and/or applying oil or the like to the depressions.

The nozzles 50, showing in Figures 8 and 9, are adapted to admix another phase with the sol. For example, the sol may be introduced through line 52 and be efficiently admixed in the nozzle with a gaseous or liquid phase supplied at 51. Solids may also be incorporated, either as powders or slurries.

Referring now to Figure 10, the sol may be supplied by a pipe 65 to a spinneret 66 having a plurality of small orifices through which the sol is extruded to a bath of aqueous ammonia in a vessel 67. The bundle of gel filaments so produced are drawn off by any suitable means such as godet 68, similar in construction to those employed in spinning rayon and the like. The bundle of filaments are passed once around godet 68 and then preferably passed to a second godet 69 about which they are also passed once. Godet 69 is preferably driven at a greater peripheral speed than is godet 68, thus stretching the filaments to improve their characteristics by orientation of molecules and molecular aggregates.

The gel filaments may be processed continuously as a yarn or filament bundle, or, as short lengths, processed in batch fashion. According to the latter embodiment, the bundle may be wound in skeins, cut into staple fibers of lengths on the order of 1 to 10 inches, or formed into woven or knitted articles. For example, a loose rope or belt of the filaments may be formed in known manner for the handling of textile fibers, washed, base exchanged if necessary, dried and heat treated to form a catalyst. The flexible rope or belt of catalyst may then be passed through conversion and regeneration zones continuously for catalyzing a desired reaction and regeneration of the catalyst.

Figure 11 shows apparatus for forming very small, rounded pellets of gel by feeding the sol to a rotating disc 70 from inlets 71. The sol is dispersed into the top of column 72 by centrifugal force and an atmosphere of ammonia gas in the column causes gelation of the fine droplets of sol. If desired, ammonia gas may be withdrawn through pipe 73. Fresh ammonia supplied at the bottom of the column may be heated to induce partial drying of the hydrogel, say to a water content of 50 per cent or less. This will result in water vapor being mixed with the withdrawn ammonia which may then be partially or wholly dehydrated, heated and recycled.

In the preparation of catalytic and adsorptive materials it is desirable, in many cases, to composite two or more gels or a gel and a precipitate. We have found that the best procedure for accomplishing this is to prepare the sols separately, mix them and as soon as they have increased in viscosity, we subdivide the viscous sol into small particles and introduce them into a coagulating agent. Alternatively, the sols may be permitted to age separately and then after intimate mixing they are converted into hydrogel pellets in similar manner. When a mixture of a gel and a precipitate is desired, the sol and the precipitate are formed separately, composited intimately, divided and coagulated according to our invention. This novel method has many advantages over prior art; particularly, a more uniform product is obtained and in addition in the best possible physical form.

The hydrogel pellets prepared by any of the methods contemplated by the present invention can be washed and dried in the conventional manner to produce catalysts and adsorbents.

Inasmuch as a coagulating medium such as aqueous ammonia can produce pronounced changes in the structure of a gel, consideration must be given to the length of time the hydrogel particles remain in the said medium. The effect of aqueous ammonia is to decrease the densities of gels containing silica. The longer the time of residence in ammonia, the lower the apparent density of the resulting dry gel. In some cases, this effect results in an advantage, while in others, it is undesirable. We have found that the effect of the coagulating fluid on the hydrogels can be counteracted by washing the hydrogels with acidic solutions, buffered solutions, or solutions containing various acidic salts. Obviously, we can control the structure of the gel so as to obtain any desired apparent density and porosity.

*Example 1.—Silica-alumina gels*

An acid solution was prepared by mixing 2.60 liters of 38% hydrochloric acid (1.19 specific gravity) with 4 liters of a solution containing 885 grams of $Al_2(SO_4)_3 \cdot 18H_2O$ and making the total volume of the solution equal to 10.25 liters. A second solution was prepared by diluting 18.7 pounds of "N" brand sodium silicate (28.7% SiO₂, 8.9% Na₂O) with water to form 17 liters of solution. These two solutions were mixed by adding the latter solution to the former while agitating the acid solution efficiently with a mechanical device. The resulting colloidal solution had a pH of 0.3.

A portion of the hydrosol was neutralized to a pH of 2.5 to form a viscous sol by careful addition of aqueous ammonia while efficiently mixing the sol. This viscous sol was added dropwise to a vessel containing a layer of oil beneath which there was an aqueous ammonia solution of 0.90 specific gravity. The sol globules assumed spheroidal shapes while falling through the oil layer and coagulated immediately on entering the ammonia solution forming hydrogel beads which on washing with water and drying retained their spheroidal form.

A second portion of the hydrosol was neutralized by mixing with ammonia to form a viscous sol containing a substantial amount of precipitated hydrous silica alumina. This sol gave good beads on dropping into aqueous ammonia in spite of the precipitate which it contained.

A third portion of the hydrosol was heated at 75° C. for a period of two hours in order to convert the sol to a viscous sol; which, on dropping into aqueous ammonia resulted in perfect hydrogel beads. These hydrogel pellets, after washing and drying, retained their spheroidal form.

The remainder of the hydrosol after standing about 12 hours congealed to a viscous fluid sol which was converted into spheroidally-shaped hydrogel pellets in the manner described above. These pellets were washed with water until free of soluble salts and after drying and heating at 1100° F. were tested as cracking catalyst under standard conditions, which are defined as passing Oklahoma City gas oil having a boiling range of 470° to 708° F. through the catalyst bed at 800° F. and a liquid space velocity of 1.5 for twenty-minute periods. The activity is referred to as the per cent by volume of gas oil converted to 400° F. endpoint gasoline. The catalyst in this instance had an activity of 37%. A more active catalyst having an activity of 52% was obtained by soaking the washed hydrogel pellets of this example in a 15% solution of Al(NO₃)₃·9H₂O.

Example II.—Alumina gel

Sixty grams of glacial acetic acid were diluted with 6 liters of distilled water. To this solution were added 2 grams of mercuric oxide and 120 grams of 12–16 mesh size granules of metallic aluminum. The acetic acid solution was maintained at 75° C. and stirred by means of a mechanical mixer until solution of aluminum was complete. The resulting alumina hydrosol was filtered and then converted into a viscous fluid sol by cautiously adding aqueous ammonia while agitating the sol efficiently. Droplets of the alumina sol were added to a container of oil and aqueous ammonia, thus forming spheroidally-shaped hydrogel pellets, which were dried carefully without washing to yield hard, glassy and transparent alumina gel beads.

Example III.—MoO₃ on alumina gel

A viscous alumina sol prepared as described in Example II was impregnated with ammonium molybdate by extruding the jelly into an aqueous solution containin ammonium molybdate and ammonia. The hydrogel pellets were dried slowly without washing and gradually heated to 1000° F. at which temperature they were maintained for four hours. The alumina-molydenum oxide pellets produced in this manner are excellent catalysts for the dehydrogenation of hydrocarbons, for the aromatization of n-hexane, n-heptane, n-octane, i-octane, etc., for the reforming of naphthas to increase their octane number rating, and for many other hydrocarbon conversion reactions.

An alternative method of preparing the molybdenum oxide impregnated alumina-gel bead catalyst involves congealing the hydrosol with ammonium molybdate solution or a solution of ammonia and ammonium molybdate.

Example IV.—Titania gel

Three hundred grams of sodium titanate (Na₂Ti·O₃) was added gradually in small portions to 825 grams of a solution of 38% (by weight) hydrochloric acid with constant stirring and while the solution was maintained at room temperature by cooling in an ice bath. The resulting solution was milky in appearance and therefore was filtered through a mat of asbestos. A 20% solution of ammonium carbonate was added dropwise to the titania solution at such a rate that the precipitate which formed re-dissolved on vigorous stirring of the sol. Addition of ammonium carbonate solution was stopped when the sol attained a pH of 2.5. After about twenty minutes, the sol congealed to a viscous fluid hydrosol which was formed into hydrogel pellets by dropping globules into an aqueous ammonia solution. Before all of the sol was converted to hydrogel globules, the jelly became too viscous to handle and therefore was kneaded with a small amount of hydrochloric acid to make it more fluid. After this treatment the titania sol was formed into hydrogel pellets without any difficulty. The hydrogel was washed with water until free of soluble salts and then was dried slowly to yield hard, glassy and transparent titania gel beads.

The above method of fluidizing titania sol which has commenced to gel has been applied satisfactorily to other sols such as, for example, silica, silica alumina, silica zirconia, etc.

Example V.—Silica gel impregnated with alumina

An acid solution was prepared by diluting 800 cc. of concentrated hydrochloric acid (1.19 specific gravity, 38% HCl) to 3.30 liters. While this solution was stirred with a mechanical mixer, 3.00 liters of a sodium silicate solution, prepared by diluting 2100 grams of "N" brand sodium silicate to this volume, were added to form a silica hydrosol which congealed to a viscous sol about 12 hours later. Silica hydrogel beads were prepared from the viscous silica hydrosol in the manner described in the previous examples. The hydrogel pellets after washing with water were soaked overnight in a 30% solution of

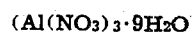

(Al(NO₃)₃·9H₂O)

The impregnated pellets were drained free of solution, dried carefully and heated at 1100° F. for five hours. These pellets had an activity of 52% when tested as cracking catalyst under standard conditions.

Example VI.—Silica gel impregnated with precipitated alumina

A gelatinous precipitate of alumina was prepared by neutralizing with aqueous ammonia 1.80 liters of a solution containing 490 grams of $Al_2(SO_4)_3 \cdot 18H_2O$. This precipitate was kneaded into a homogeneous mixture with viscous silica hydrosol prepared from the concentration and proportion of reagents employed in Example V. Hydrogel pellets were prepared from the composite by dropping globules into an aqueous ammonia solution. The hydrogel particles were washed and dried as described for the hydrogel of Example V. This catalyst had an activity of 38% when tested in cracking gas oil at standard conditions.

*Example VII.—Alumina gel beads from aluminum nitrate*

To 500 cc. of a solution containing 300 grams of $Al(NO_3)_3 \cdot 9H_2O$ was added slowly with vigorous stirring 120 grams of $(NH_4)_2CO_3 \cdot H_2O$ while the temperature was maintained at 90°–95° C. After concentration of this solution to 360 cc. it had a pH of 4.8. 180 cc. of 8 normal ammonium acetate was added to the alumina solution to form an alumina sol of pH 6.4, which on standing partially coagulated to a viscous liquid. The latter was extruded through a column of oil into a layer of concentrated aqueous ammonia (specific gravity 0.90). On passing through the oil layer the hydrosol globules assumed spheroidal shapes which they retained on entering the ammonia layer to form firm, transparent hydrogel beads. Standing in the ammonia layer for five minutes, the hydrogel beads were removed, washed with 0.20 N ammonium carbonate until substantially free of nitrate ions, dried by contact with steam at 260–280° F. for 120 minutes, and then heated overnight to 900° F. The product retained its spheroidal shape and it was hard, glassy and transparent.

As pointed out hereinabove, two conditions are required for successful operation of the process with gels in general. The aqueous gelation medium must be an ammonia solution and the viscosity or, what amounts to the same thing, the degree of aging must be properly adjusted. The viscosity of the sol at the time it enters the aqueous ammonia must be such that the sol retains its form on passing through the interface and until the action of the aqueous gelation medium hardens the outside of the formed pieces to hydrogel which is self-sustaining. This stage of viscosity is not subject to statement in terms of the conventional methods of measuring viscosity since it cannot be satisfactorily measured due to the constant change in this property. Viscosity measurements are made by determining rate of flow through an orifice and must involve a substantial period of time. The viscous sols with which this invention is concerned would change so greatly over the time of measurement that the value obtained would be meaningless. Such determinations are also rendered useless because the sol tends to gel before the measurement can be completed.

The critical viscosity is therefore defined herein by visual comparison to a standard item of commerce and by reference to degree of aging. Where reference is made herein to a "viscous sol," that term is defined as complying with the visual standard and also falls within the scope of the aging criterion. For best results, the sol should have a viscosity about like that of molasses at the time it passes the interface into the aqueous ammonia. If it has a viscosity such that it flows in the same manner as molasses at room temperature it will be found satisfactory under all conditions we have encountered. Optimum viscosity will, of course, vary somewhat with surface tension at the interface (which is subject to control by the operator as by use of surface active polar compounds) and concentration of ammonia in the aqueous medium. However, it is found that good results may be obtained regardless, if the viscous sol has a viscosity on the order of that of molasses. This is the visual comparison to which reference is made above.

In general, the viscosity of the sol should be at least as great as that resulting from aging for 75% the gelation time which is defined as the time elapsed between formation of the sol and formation of a self-sustaining hydrogel. Preferably the viscosity is equal to that resulting from aging for 80% of the gelation time. Formation of the hydrogel is conveniently determined by thrusting a glass stirring rod down into the mass. A hydrogel has been formed when the rod can be held in vertical position by the gel.

The effect of viscosity is aptly illustrated by Table I below. A sol was prepared in accordance with Example I and maintained at 60° C. to accelerate gelation. Portions were taken at the intervals indicated and introduced to a body of gas oil over 13.3% aqueous ammonia. The nature of the product obtained shows the importance of viscosity.

*Table I (Example VIII)*

| Elapsed Time after Mixing | Fraction of Gelation Time | Viscosity (Visual) | Product |
|---|---|---|---|
| 13 min | 0.069 | Free Flowing (as water) | No spheres, opaque irregular fragments. |
| 43 min | .23 | ---do--- | Do. |
| 73 min | .39 | ---do--- | Do. |
| 93 min | .49 | ---do--- | Do. |
| 113 min | .60 | Slightly Viscous (thin syrup). | No spheres, larger fragments. |
| 133 min | .71 | ---do--- | Do. |
| 153 min | .81 | Moderately viscous (molasses). | Excellent spheroids. |
| 163 min | .87 | Very Viscous (tar) | Spheroids, distorted but smooth surfaced. |
| 188 min | 1.0 | Gel | |

Another series of tests were run to determine the effect of ammonia. It was found that other alkaline solutions of comparable pH are not effective. The several sols listed in Table II were tested over a range of viscosities as in Table I using different alkaline solutions.

*Table II*

[Composition of hydrosols—100 cc. sodium silicate (0.203 gm. $SiO_2$/cc.)—38.2 cc. aluminum sulfate (0.040 gm. $Al_2O_3$/cc.)]

| Example | Acid Added | pH of Sol | Percent Solids |
|---|---|---|---|
| IX | 77.0 cc. 15.5% HCl | 0.4 | 6.9 |
| X | 20.0 cc. 3.83 N HCl | 8.0 | 4.9 |
| XI | 21.0 cc. 3.83 N HCl | 7.6 | 4.9 |
| XII | 21.95 cc. 3.83 N HCl | 6.9 | 4.9 |
| XIII | 22.5 cc. 3.83 N HCl | 4.4 | 4.9 |

Each of these sols gave good beads according to the present process when using aqueous ammonia and observing the viscosity limitation defined above. These sols were also tested for formation of beads by introducing sols of varying age into an oil column over 1 N sodium carbonate, 3 N sodium carbonate and 1 N sodium bicarbonate. It was found that spheroids could not be formed by the present process with any of the three alkaline solutions enumerated. In only one modification was it possible to find any smooth surfaces on the freshly formed fragments. In that instance, the sol was introduced to the bottom of the body of carbon tetrachloride having a layer of 3 N sodium carbonate thereabove. The majority of surfaces on the fragments (none of which were spheroidal) so formed were irregular but a small proportion of smooth surfaces were found. These fragments cracked badly on drying.

This application is a continuation-in-part of our prior copending application Serial No. 529,822, abandoned, filed April 6, 1944.

We claim:

1. The process of preparing inorganic oxide gels as smooth surfaced particles which comprises forming a gelable sol of inorganic oxide having the inherent property of setting to a rigid hydrogel without substantial change in chemical composition after the lapse of a period of time from formation characteristic of the composition and temperature of the sol, converting said sol to a viscous sol having a viscosity at least as great as that characteristic of said sol after expiration of about 75% of said period of time, separating said viscous sol into a plurality of small portions having a predetermined form and immersing said formed small portions while still having the property of viscous flow characteristic of the sol at the resultant stage of impending gelatin in aqueous ammonia to cause gelation of the fluid viscous sol while retaining therein substantially all the constituents of the sol and retaining the physical form substantially constant.

2. The process of preparing inorganic oxide gels containing silica as smooth surfaced particles which comprises forming a gelable sol of inorganic oxide including silica having the inherent property of setting to a rigid hydrogel without substantial change in chemical composition after the lapse of a period of time from formation characteristic of the composition and temperature of the sol, converting said sol to a viscous sol having a viscosity at least as great as that characteristic of said sol after expiration of about 75% of said period of time, separating said viscous sol into a plurality of small portions having a predetermined form, and immersing said formed small portions while still having the property of viscous flow characteristic of the sol at the resultant stage of impending gelation in aqueous ammonia to cause gelation of the fluid viscous sol while retaining therein substantially all the constituents of the sol and retaining the physical form substantially constant.

MILTON M. MARISIC.
EDWARD M. GRIEST.

REFERENCES CITED

The following references are of record in the file of this patent:

UNITED STATES PATENTS

| Number | Name | Date |
|---|---|---|
| 1,755,496 | Behrman | Apr. 22, 1930 |
| 2,284,248 | Baker et al. | May 26, 1942 |
| 2,384,946 | Marisic | Sept. 18, 1945 |
| 2,450,394 | Brown et al. | Sept. 28, 1948 |